(12) United States Patent
Damm

(10) Patent No.: US 8,006,279 B2
(45) Date of Patent: Aug. 23, 2011

(54) DISTRIBUTIVE SYSTEM FOR MARKING AND BLOCKING VIDEO AND AUDIO CONTENT RELATED TO VIDEO AND AUDIO PROGRAMS

(75) Inventor: Gerard Louis Jacques Paul Damm, Plano, TX (US)

(73) Assignee: Alcatel Lucent, Paris (FR)

( * ) Notice: Subject to any disclaimer, the term of this patent is extended or adjusted under 35 U.S.C. 154(b) by 1089 days.

(21) Appl. No.: 11/010,047

(22) Filed: Dec. 10, 2004

(65) Prior Publication Data
US 2006/0130118 A1     Jun. 15, 2006

(51) Int. Cl.
*H04N 7/16* (2006.01)
(52) U.S. Cl. .......... 725/142; 725/135; 725/143
(58) Field of Classification Search ........... 725/25, 725/28, 32, 46, 38, 47, 135, 127, 115; 345/302; 348/170
See application file for complete search history.

(56) References Cited

U.S. PATENT DOCUMENTS

| | | | |
|---|---|---|---|
| 5,610,653 A * | 3/1997 | Abecassis | 348/170 |
| 5,684,918 A * | 11/1997 | Abecassis | 386/83 |
| 6,522,342 B1 | 2/2003 | Gagnon et al. | |
| 6,792,615 B1 | 9/2004 | Rowe et al. | |
| 6,983,478 B1 * | 1/2006 | Grauch et al. | 725/13 |
| 7,249,366 B1 * | 7/2007 | Flavin | 725/25 |
| 7,360,234 B2 * | 4/2008 | Robson et al. | 725/127 |
| 7,493,640 B1 * | 2/2009 | Derrenberger et al. | 725/42 |
| 2002/0041629 A1 * | 4/2002 | Hannuksela | 375/240.12 |
| 2002/0046405 A1 | 4/2002 | Lahr | |
| 2002/0092019 A1 | 7/2002 | Marcus | |
| 2003/0005464 A1 * | 1/2003 | Gropper et al. | 725/115 |
| 2003/0093790 A1 * | 5/2003 | Logan et al. | 725/38 |
| 2003/0097655 A1 * | 5/2003 | Novak | 725/31 |
| 2004/0055012 A1 | 3/2004 | Kimball et al. | |
| 2004/0064537 A1 * | 4/2004 | Anderson et al. | 709/223 |
| 2004/0148638 A1 | 7/2004 | Weisman et al. | |
| 2005/0097595 A1 * | 5/2005 | Lipsanen et al. | 725/25 |

FOREIGN PATENT DOCUMENTS

WO     2004/008764 A1     1/2004

* cited by examiner

*Primary Examiner* — Joseph P Hirl
*Assistant Examiner* — An Nguyen
(74) *Attorney, Agent, or Firm* — Donald R. Boys; Central Coast Patent Agency, Inc.

(57) ABSTRACT

A system is provided for rating multimedia content streamed over a data network as a series of data frames, segments, or packets and for administering display of the rated content. The system includes at least one content source device for creating raw multimedia content; an intermediate content marking and delivery agent for marking and delivering the content created; and a content receiving device for displaying or rejecting delivered content according to detection of and comparison of content markings applied to at least one preset value. In one aspect, the content marking follows some existing or devised rating system and whereupon the marked content is identifiable at the receiving end for each received data frame, segment, or data packet carrying content in a payload.

34 Claims, 6 Drawing Sheets

DISTRIBUTIVE SYSTEM FOR MARKING AND BLOCKING VIDEO AND AUDIO CONTENT RELATED TO VIDEO AND AUDIO PROGRAMS

FIELD OF THE INVENTION

The present invention is in the field of multimedia products, particularly multimedia streaming over Internet protocol, and pertains to methods and system for blocking certain content from multimedia streams from being received and/or displayed on an end user device.

BACKGROUND OF THE INVENTION

In the field of systems for producing, delivering and displaying multimedia content, there has been considerable development of systems and methods for enabling parental or administrative control over exactly what content may be viewed or heard on an end user device. For example, in the areas of antenna-based broadcast systems, or of satellite and cable television broadcast systems, there are technologies that allow an administrative user to configure and apply channel blocking, program blocking, and some audio content blocking to available media programs based on pre-defined ratings.

For satellite and cable television systems, a variety of remote control operated features are now available for blocking channels, programs, or offensive content detected in programs. V-chip technology is one of these implemented via a hardware chip added to the viewing terminal. The V-chip blocks content by reading the ratings embedded in television signaling data frames or recorded video and turns off the signal when the ratings exceed certain ratings-based thresholds set by the parents. V-chip technology utilizes a relatively complicated, but generally well known rating scheme including all youth (Y), youth 7 or older (Y7), general audience (G), parental guidance suggested (PG), teen 14 or over (TV14), and mature audience only (MA). Programs having these ratings may also include sub-ratings like contains violence (V), contains sexual situations (S), contains coarse language (L), and contains suggestive dialogue (D).

Some existing program blocking methods include time-based blocking wherein an administrator (typically a parent) may block channels during any specified time intervals of a programming period. There are also time allowance systems that amount to a simple timer function installed on a display terminal (television). These systems enable specification and application of viewer blackout periods and may also provide time-based viewer credits based on viewer account status wherein the viewer may initiate a viewing period, which terminates when the allowed time period expires.

More popular program-based filtering commonly associated with satellite television systems enables a ratings-based selection of programs and or channels to be blocked. Groups of programs may be blocked using this system. The Motion Pictures of America Association (MPAA) has instituted the general ratings G, PG, PG-13, R, TV-14, and NC-17, which may also be accompanied by the sub-indicators for content like V, S, L, D, and so on. While these rating indicators are generally well known in the U.S. and are prevalent in the art, many end users have some trouble remembering which type of content each symbol really covers and describes.

Another more complicated system is known in the art as TV Guardian™, which applies to audio or closed-captioning often associated with presented programs. It uses a word recognition system to detect profanity or suggestive language in real time and mutes the audio accordingly, preventing it from being heard by the viewer, while allowing accepted language to be presented. The video portion of the program filtered with TV Guardian™ is not affected.

More recently, content blocking services have been made available to personal computer (PC) users for the purpose of blocking certain websites or web-based content from being displayed by a web browser interface. Such controls are typically available through an Internet service provider (ISP) and may be available options settings provided in a browser tool bar or other control or configuration options interface. Web-based content filtering or blocking typically uses a known list of offensive vocabulary words and/or banned website universal resource locators (URLs) or other data source identifiers to filter by comparison. Therefore, if a Web site containing offensive language is accessed, the vocabulary list may be used to detect that language. Upon detection of the offensive content, the browser may be set to default display of a blank URL or to a default re-direct to an accepted URL or data source. Some anti-virus products also contain parental controls in their firewall solutions.

While all of the existing solutions work to some extent to block unwanted content, new methods of content delivery and availability of new and emerging multimedia display devices create certain vulnerabilities in the existing methods. Other limitations are also apparent to one with skill in the art of multimedia content filtering. The boundaries between data network telephony (DNT), of which Internet protocol network telephony (IPNT) is a subset, and data packet enabled satellite and cable network content delivery paths are increasingly blurred by improvements in the capabilities of transversing between networks and transport protocols when accessing or delivering content. Cellular telephones capable of accessing IP data networks are increasingly being marketed as content receiving devices capable of receiving, displaying, and storing, and sharing multimedia content. Some "bleeding edge" devices have up to 2 gigabytes of storage capability. These and other like devices, including new devices being developed, are fully multimedia capable and highly mobile and may receive content from a variety of defined networks.

Further to the above, providing multimedia content and making it available to consumers is becoming less complicated and can be achieved at increasingly lower costs using video and audio streaming. This factor, in combination with more robust access and delivery networks including a wider variety of possible receiving devices, has resulted in an explosion of available live content and introduction of non-traditional content sources, both domestic and foreign, including some that do not normally adhere to any ratings criteria. Moreover, new bleeding edge media devices are increasingly compact and mobile and may therefore not be adapted for ratings schemes of other countries, for example.

In the case of live digital multimedia content, unplanned objectionable subject matter included in the program may not be blocked because of a general, pre-assigned program rating that defines the overall program as acceptable, for example, for family viewing or the like. Likewise, there are currently no customizable solutions for filtering objectionable content from an accepted rated program leaving the individual forced to agree wholly or not to agree at all about whether a specific rating is valid from the view of the decision maker for covering the subject matter for viewing by younger children and so on.

There are several other problems in the art with conventional content blocking systems. One main disadvantage is that there are currently no universally adapted ratings systems. This may create problems because some foreign content that is not rated but that is otherwise acceptable even exemplary viewing material may be blocked by conventional systems unless the material is reviewed, rated, and re-packaged for delivery by an intermediary source. Other limitations include complicated programming steps for configuring and applying program; channel, and content blocking settings and software and hardware expenses related to end-device capabilities passed on to the end user; and the lack of more granular content blocking capabilities. Moreover, newer and emerging devices, in many cases, may not be equipped with any standardized content blocking capabilities.

What is clearly needed in the art is a distributive system and methods for enabling administratively controlled blocking of streaming multimedia content that may be applied to content received from any available content source accessible over a network including live multimedia programming in a fashion that can be universally standardized and that may be applied without taxing end user devices. Such a system would improve granularity of content filtering and would reduce much content preparation tasks at the network or feed-in level.

SUMMARY OF THE INVENTION

A system is provided for rating multimedia content streamed over a data network as a series of data frames, segments, or packets and for administering display of the rated content. The system includes at least one content source device for creating raw multimedia content, an intermediate content marking and delivery agent for marking and delivering the content created, and a content receiving device for displaying or rejecting delivered content according to detection of and comparison of content markings applied to at least one threshold value.

In a preferred embodiment, the content marking follows some existing or devised rating system and whereupon the marked content is identifiable at the receiving end for each received data frame, segment, or data packet carrying content in a payload. Also in a preferred embodiment, the network is one or a combination of an Internet protocol network, a satellite television network, a cable television network, and a cellular telephony network.

In one embodiment, the content source device is one of a video camera, a video telephone, a Web camera, or a microphone. In this embodiment, the content receiving device is one of a television, a set-top box with a connected video display unit, a computer with a video display screen, or a cellular telephone.

In one embodiment, the content marking and delivery agent is one of an Internet service provider, a satellite-programming provider, a cable-programming provider, or a cellular telephone service provider. In a preferred embodiment, the multimedia content includes one or a combination of video and audio and text subtitle.

In one embodiment, the content markings include one or a combination of an overall rating and at least one sub-rating category level. In this embodiment, the threshold may include one or a combination of an overall rating and at least one sub-rating category level. The sub-rating category levels may be configurable.

According to another aspect of the present invention, a utility for applying rating information related to multimedia content to data packets, data frames, or data segments adapted to carry the content over a data network is provided. The utility includes an input port for receiving the multimedia content, a packet builder for creating data packets, data frames, or data segments to carry the content, a data bit handler within the packet builder for inserting, removing, or otherwise manipulating existing bit values contained in an information field portion of each data packet, data frame, or data segment created, and an output port for outputting the created data packets for network delivery.

In one embodiment, the utility is software application running on a host multimedia processing terminal and the input and output ports are virtual ports. In another embodiment, the utility is a hardware device running software and the input and output ports are hardware port structures. In a preferred embodiment, the data network is one or a combination of an Internet network, a satellite television network, a cable television network, and a cellular telephony network. In this embodiment, the multimedia content includes one or a combination of video and audio and text subtitle.

In one embodiment, the bit values define one or a combination of an overall rating and at least one sub-rating category level. Also in one embodiment, the bit values define one or a combination of an overall rating and at least one sub-rating category level, the bit values pertaining to content carried in the payload portion of each data packet.

In one embodiment, the utility also includes metadata associated with the multimedia content received, the metadata describing at least existence of, categorization of and level of the each categorized content according to a ratings system. In this embodiment, the metadata is extensible markup language received with the multimedia content.

In one embodiment, the information field is a field added to the header portion of each data packet, data frame, or data segment. In a preferred embodiment the information field and bit values may be provided by a network layer transport protocol. In this embodiment, the protocol may be an extension of the real-time transport protocol.

In cooperation with a utility for applying rating information related to multimedia content to data packets, data frames or data segments adapted to carry the content over a data network, according to another aspect of the invention, a method is provided for administering display of the rated multimedia content. The method includes steps for (a) beginning download of the content to a content player, (b) determining rating of the content, (c) comparing the determined rating of the content to a preset rating threshold applying to the content; and (d) determining whether to display the content based on the comparison results.

In a preferred aspect, in step (a), the content player is one of a television set, a set-top box having a video display unit, a software media player, or an audio playback device. Also in a preferred aspect, in step (b), the determination of rating is made repetitively for each downloaded data packet, data frame or data segment. In all aspects in step (b), the rating represents a rating level associated with a rating system of more than one rating level. In one aspect, in step (b), the rating further defines at least one sub-rating category and the level of existence of the at least one category in the data packet, data frame, or data segment.

In one aspect of the method, in step (c), the comparison is made by consulting a ratings settings table. In this aspect, in step (c), the preset threshold defines an acceptable rating and one or more acceptable levels of any sub-rating categories associated with the determined rating. Also in this aspect, in step (c), the sub-rating category levels may be adjustably set according to a provided increment of adjustment, the threshold value then defining an acceptable overall rating and any levels of associated sub-rating categories associated with the overall rating. In another aspect, in step (c), the sub-rating categories define content not categorized by violence, nudity, coarse language, or suggestive dialogue.

In one aspect of the method, in step (d), the resulting determination is one of blocking the content in its entirety from display. In a variation of this aspect the resulting determination is one of displaying the content in its entirety. In still another variation to this aspect, the resulting determination is one of displaying some of the content and blocking some of the content replacing the blocked content with blank display.

In the above aspect, in step (d), the resulting determination may be one of displaying video while blocking audio; blocking video while displaying audio; or one of displaying and blocking some video and some audio. In this aspect the content may include subtitling.

BRIEF DESCRIPTION OF THE DRAWING FIGURES

DESCRIPTION OF THE PREFERRED EMBODIMENTS

Figure 1:
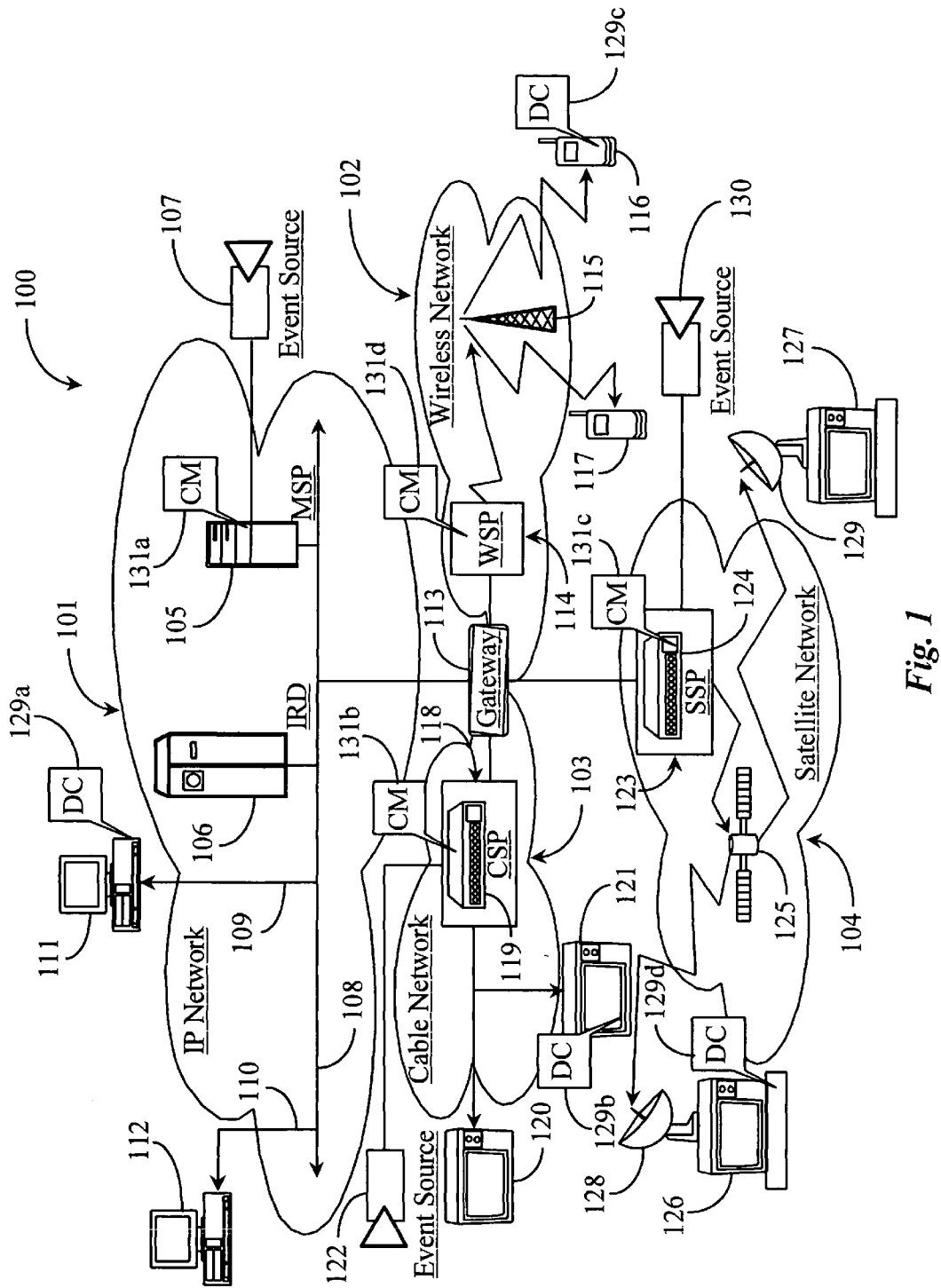
FIG. 1 is an architectural overview of a multimedia delivery network wherein multimedia content rating and marking is performed at network level according to an embodiment of the present invention.

FIG. 1 is an architectural overview of a multimedia delivery network 100 wherein multimedia content marking is performed at network level according to an embodiment of the present invention. Multimedia network 100 combines a variety of digital networks, which are known for propagation of digital programming and multimedia access and delivery capabilities. These are an Internet protocol (IP) network 101, a wireless digital cellular network 102, a digital cable television network 103, and a digital satellite television network 104.

All of networks 101-104 carry digital data in the form of data packets, data cells, data segments, or data frames, and may support unicast, multicast, and broadcast media content. IP network 101 may be assumed to be an Internet network and has a network backbone 108 illustrated therein that may logically represent all of the access points, equipment and data lines making up the Internet as a whole. A media service provider (MSP) 105 is illustrated within IP network 101 and is illustrated as having a data connection to backbone 108. MSP 105 may be any enterprise or entity, large or small, that may provide subscribed or pay-per-view access to media content including audio, video/audio, or video to consumers. MSP 105 may be an individual with one server or a large organization with a proprietary network of a plurality of media servers.

An event source 107 is illustrated in association (by data connection) with MSP 105 and may represent any video feed in or upload of multimedia content, live or prerecorded to MSP 105 for media processing and subsequent program rendering. Event source 107 may be a video enabled source like a Web cam, or other digital video or still camera source adapted to capture live content and upload that content to MSP 105. Event source 107 may also be one or more audio recording systems characterized by microphone or telephony system. A plurality of consumer stations 111 and 112 is illustrated having network access to IP network 101, the stations being physically or, in one embodiment, wirelessly connected to backbone 108. Consumer stations 111 and 112 are in this example, personal computers adapted to access the Internet typically using a digital subscriber line (DSL) service or other high-speed broadband connection made available, typically through an Internet service provider (ISP) not illustrated. Stations 111 and 112 may also, in one embodiment, represent corporate consumers connected to network 101 and may include sub-networks each supporting a plurality of individual consumer stations.

Cable network 103 may be any digital cable television service network. Network 103 has access to Internet network 101 and thus to MSP 105 through a logical communication gateway 113 connecting the two networks. Gateway 113 is meant to represent any required gate between two otherwise physically separate networks. A cable service provider (CSP) 118 is illustrated within network 103 and may represent any provider of cable television viewing services to consumers. CSP 118 may be a music provider, a video programming provider, or a combination thereof. CSP 118 has service provider equipment 119 illustrated therein and adapted to receive and to process multimedia content for delivery to subscribers. Cable network 103 represents a wired network and may, in some cases contain more than one provider of services using the same equipment and lines.

A plurality of consumer stations 120 and 121 is illustrated as having access to cable network 103, more specifically to CSP 118 using the physical cabling of the network. In this example, consumer stations 120 and 121 are cable-ready television sets. Stations 120 and 121 may also support cable television boxes for adapting those stations to receive digital cable television programming. An event source 122 is illustrated as having connection to CSP 118 and is adapted similarly as event source 107 described further above. For example, event source 122 may provide raw digital video, audio, or video/audio multimedia content to CSP 118 for processing and rendering over network 103 to consumer stations 120 and 121.

An exception in the similarity between event source 122 and event source 107 is that source 122 may not be Internet connected and therefore may not logically represent a Web cam, for example. Rather, source 122 may represent a cable-ready live feed camera or other like cable-ready, media-capture equipment. It is noted herein that event source 122 may, in some embodiments, provide media content indirectly to MSP 105 and that event source 107 may provide media content indirectly to CSP 118 through gateway 113. In actual practice, CSP 118 may derive source material from MSP 105 and MSP 105 may derive source material from CSP 118, the materials originally recorded at the localized event sources.

Satellite network 104 has a digital satellite service provider (SSP) 123 illustrated therein and adapted to provide satellite television viewing program services to consumers. SSP 123 has equipment 124 adapted as a component thereof, which may include all applicable components for providing services. Network 104 may typically have a much larger geographic range than that of cable network 103. SSP 123 may be a small entity or a large corporation with many orbiting satellites illustrated herein as a satellite 125. SSP 123 may be a music service provider, a video programming provider, or a combination thereof as was described further above with respect to CSP 118.

A plurality of consumer stations 126 and 127 is illustrated as having a wireless access to SSP 123 leveraging respective satellite receiver dishes 128 and 129. Consumer stations 126 and 127 are adapted with satellite set-top-boxes that are typical customer premise equipment (CPE) along with dish installations 128 and 129. An event source 130 is illustrated as having a line in connection to SSP 123 and is adapted to provide raw digital multimedia content to SSP 123 for processing and rendering to consumer stations 126 and 127 via satellite 125. Event source 130 may also be a wireless application such as a satellite videophone or camera instead of a hardwired feed. It is noted herein that SSP 123 has access to Internet network 101, more particularly to MSP 105 by leveraging gateway 113. Likewise, SSP 123 may communicate with CSP 119.

Wireless cellular network 102 has a wireless service provider (WSP) 114 illustrated therein and adapted to provide wireless telephony and data download services to consumers. WSP is also connected to gateway 113 and may have access to MSP 105, CSP 118, or SSP 123. WSP 114 may be a small entity or a large service provider as generally described above with respect to the other mentioned provider types. WSP 114 has one or more cellular towers 115 defining the network range and may be local only, country wide, or even worldwide.

A plurality of consumer stations 116 and 117 is illustrated as having digital wireless access to WSP 114 through cell tower 115. Consumer stations 116 and 117 are cellular telephones in this example and may be of the form of memory rich bleeding edge devices described with reference to the background section of this specification. Stations 116 and 117 may be used for telephony and may be enhanced further for multimedia dissemination of video, pictures, video/audio, and audio. In this regard, stations 116 and 117 may access source material from Internet 101, network 103, or from network 104 through gateway 113.

In one rather emerging embodiment, stations 116 or 117 may also be adapted as an event source similar to those already described. Cellular telephones 116 and 117 may in fact be adapted to capture raw digital video, audio, and still pictures and may upload them to WSP for processing and rendering to other stations. Stations 116 and 117 are highly mobile and may roam over a large geographic range and still access services. Likewise, they may be IP enhanced for communication with other multimedia services like MSP 105 for example.

One with skill in the art of multi-networking in a multimedia embodiment will readily appreciate that each of the described consumer stations in their respective networks may also access services based in other networks using known state-of-art technologies for bridging networks, protocols, and services. For example, stations 120, 121, 126, 127, 116, and 117 may all be adapted to receive and display IP related multimedia sourced from virtually anywhere within IP network 101 using such as Web-TV services and Internet services brokered through their perspective service providers. Likewise, certain stations in some embodiments may be multi-network and service-capable, meaning that they may access separate services through separate networks and may receive programming through those connections.

It is clear that any one station may now, in today's multimedia market, access multimedia content from multiple sources. Further, that accessible content may contain objectionable subject matter for some potential viewers whereby the content may not be rated under any particular ratings system and therefore may not be detected by traditional parental control features that may be available on a consumer station. In some cases, a consumer station may have to acquire and then incorporate multiple ratings schemas and apparatus to provide adequate coverage for multiple possible sources of available multimedia. Still, many multimedia presentations or programs may not have suitable or applicable ratings associated with them for generic apparatus to detect and block.

In a preferred embodiment of the invention a unique and, in some embodiments, a universal distributive system and apparatus is provided that may be used to enable administrative or parental control over multimedia presentation and program viewing for consumers operating consumer stations like stations 111-127 in a fashion that is source independent.

A client side multimedia decoding application (DC) 129a is provided to and installed on consumer station 111 and presumably also on station 112 within Internet domain 101. DC 129a may be a software component, in this case similar to a media player extension or plug in component. A version of DC 129a is provided on consumer station 121 hereinafter referred to as DC 129b. A version of 129b may also be provided to station 120. Likewise, a version of DC application is provided on consumer station 116 (DC 129c) and consumer station 126 (DC 129d). It is noted herein that some physical or architectural variances between versions of DC 129 a-d may exist because of the particular nature of the consumer station it is installed on and the network provider or providers through which services are subscribed.

For example, DC 129a may be a software plug-in that functions as an extension to any active media player or DVD software installed at station 111. DC 129b may be of the form of a firmware extension that is built into the media-decoding component of television 121. DC 129d may be a software or firmware extension to a decoding component installed on the set-top-box associated with television 126 and DC 129c may be a light software plug-in adapted for cellular telephone media player applications running on light or mini operating systems known in the art.

DC 129a-d is adapted, in a preferred embodiment, to detect the existence of a rating system and schema applied to individual data packets of a media presentation received at the respective consumer station and further, to apply administrative control settings related to any detected ratings for each data packet received and identified as part of a rated media presentation. DC 129a-d may also be adapted to detect any marked sub-rating content within a data packet and apply any sub-rating control settings pre-set and applicable to that content to determine whether to display the marked content or not to display the marked content. In this example, application of rating and content marking is performed in the network, preferably leveraging an existing network layer transport protocol or equivalent to encapsulate data packets with relevant ratings data and any associated metadata for use at the consumer stations. Such ratings data may, in one embodiment, be part of an existing system, or may be part of a devised ratings system. The metadata may be XML-based or other data that described multimedia content in terms of rating and sub-rating categories.

A content marking application CM 131a is provided and installed at MSP 105 within Internet domain 101. CM 131a is adapted to mark individual data packets with relevant ratings information and to use any associated metadata related to ratings and, or sub-ratings information to provide bit-values that are adapted to acknowledge the existence of and to define ratings data associated with content. These bit-values are, in one embodiment, added to each data packet of a multimedia presentation into a provided header field adapted for the purpose. A version of CM 131 is provided and installed at CSP 118 (CM131b), WSP 114 (CM131d) and at SSP 123 (CM 131c). There may be variations between application versions CM 131a-d according to the type of equipment and network connections present without departing from the spirit and scope of the present invention.

CM 131a-d is adapted to apply ratings information and content marking information into individual data packets of a multimedia presentation that may be delivered or otherwise made available to consumers. Content marking software may, in one embodiment, be used in conjunction with studio editing software and equipment to apply relevant ratings to a presentation and to apply any sub-rating information to the presentation. The ratings and content marking information may be packaged into or encapsulated into each data packet of a rated presentation, in a preferred embodiment, by defining a content marking field in the header of each data packet where the information is applied and manipulated as bit values. Metadata may also, in one embodiment, be encapsulated at the beginning of a payload portion of a packet to identify any marked payload content within that packet.

Multimedia presentations marked by CM 131a-d are, in preferred application, interpreted by DC 129a-d at the packet level for ratings information. A presentation may be blocked entirely if, for example, the overall rating of the presentation detectable within the first few data packets exceeds the settings on a consumer device for that program, media source, media channel, or program grouping. If the rating exceeds the rating threshold set by a consumer in association with a media player or device as interpreted by the first received packet, then the entire presentation may be blocked. If the ratings data of the first packet is acceptable according to a consumer setting, then the presentation may not be blocked and may be displayed in its entirety in some cases. However, DC 129a-d will continue to verify ratings data for each downloaded packet before accepting the packet as part of the presentation. In this way an overall rating may be applied to some portions of the presentation while another rating or ratings may be applied to other portions of the presentation, the granularity being at the packet level. Furthermore, if some data within a data packet such as audio data or graphics data is marked with metadata or otherwise indicated by bit value as exceeding some personal sub-rating threshold, then DC 129a-d may accept the packet according to overall rating, but eliminate certain data from the packet that may exceed a personal threshold for a sub-rating category being applied.

In one embodiment, there may be a version of CM application installed at the location of each event source such as on a video recording device and/or host computing system used to upload a live event captured. In this case an overall rating may be manually applied to the presentation as it is recorded. As the feed is uploaded to a provider or studio, the CM application may mark each individual packet before send according to information supplied including any metadata and the live feed may be delivered to consumers from the intermediary provider with minimal additional delay when compared to broadcasting a live and unedited feed. In this embodiment, the intermediary provider still applies the bit information to each data packet, but does not have to rate the material itself.

In a case where an Internet-sourced event may be broadcast over another network medium like cable television or satellite television, content marking may occur either at the event source, at the Internet provider site, or at the cable provider site. Marking at the event source is useful for live television feeds while content marking within a network implies that the material will have been reviewed and edited before ratings application and content marking.

In the thus far described embodiments, the marking data defines ratings information associated with a rating system and in some cases, may include sub-ratings data according to any existing categories defined. In one embodiment of the present invention an international ratings directory (IRD) 106 may be provided within IP network 101 and may be adapted to contain ratings systems from many different cooperating countries or regions and, perhaps a universal system that may be devised to cover all of the individual countries and their consumers. In the case of a universal system, then each data packet of a presentation marked for cross border delivery may contain bit values in the header portion of data packets, or more specifically, within a created content marking field within the header that identifies the international standard and exact rating level of the standard applied to the instant data packet.

In one embodiment, IRD 106 may contain separate ratings systems representing those systems adhered to or authorized by different countries or regions. It is possible that such disparate ratings systems pertinent to each country or region are quantified mathematically using some point system and then averaged together with respect given to the separate rating category equivalents to derive some universal system that all participants may agree to. In this case, administrative and parental controls could be universal in application.

In yet another embodiment, IRD 106 may be adapted to contain and to serve relevant country or region-specific ratings information to any service provider upon request. In this case, the content marker field may hold a structure that supports the multiple systems used. Therefore, bit values relevant to one region-specific rating system may be stripped from a data packet and replaced with bit values relevant to another region-specific rating system automatically. An example of when this might be useful might be if a certain programming provider sources some material, say from "out of country", with the intention of making that content available to local consumers. The two considered separate ratings systems may be widely disparate. For example, an R rating equivalent for both systems may define two completely separate standards with respect to what content may be allowed may be allowed. However if both systems are quantified and known, IRD server 106 may deliver an appropriate rating for the viewing region that compensates for the discrepancy.

In another embodiment wherein a station is highly mobile, a consumer station like station 116 that may adhere only to one ratings system of origin may be brought into another country or region where the standards are quite different. If the service provider is internationally accessible and the consumer device is being used temporarily in the other region to access multimedia, the identification of the device and device owner can be leveraged at the local provider in the new region. The local provider in the new region may then consult with IRD 106 to obtain the proper ratings information applicable to the owner of the station and may also retrieve the correct threshold settings for that device under the system. The local provider may then send a version of the requested program that is rated according to the correct system and the consumer device will then recognize the schema and will be able to apply administrative settings.

In a preferred embodiment of the present invention, the process of applying ratings information to data packets is performed relevant to a particular transport layer or equivalent operating on the network carrying the media. For example, the Internet has a data transport layer that includes transport protocols like real-time transport protocol (RTP). RTP has two parts, RTP data and real-time transport control protocol (RTCP).

The data part of RTP is a thin protocol providing support for applications having real-time properties such as continuous steamed audio and video, including timing reconstruction, data loss detection, security and content identification. RTCP provides support for real-time conferencing of groups of any size within an Internet. This support includes source identification and support for gateways like audio and video bridges as well as multicast-to-unicast translators. It offers quality-of-service feedback from receivers to the multicast group as well as support for the synchronization of different media streams.

CM 131a-d may therefore operate in synchronization with an RTP extension adapted to not only provide the correct rating system information per application to providers but may also manage bit values and any required manipulation thereof during normal transport of those packets across routing points, through gateways, through network tunnels, and so on. If, for example, data packets have to be re-sized, fragmented, or otherwise altered to continue transport, the RTP extension would ensure from the data transport layer perspective that the Bit values defined the ratings information retain their meaning even if payload sizes are changed.

In this example, each data network 101-104 is capable of transmission control protocol over Internet protocol (TCP/IP) and consumer stations are digital stations that receive and interpret data packets. It is noted herein that the method of the present invention supports various subtleties relevant to what type of receiving network a consumer device is connected to. For example, a video source may mark content and transmit packets that are TCP/IP packets wherein those packets may be re-assembled in transit for transmission over an Ethernet connection, or WIFI connection or another type of data network connection. What is important is that the content marker field containing the ratings and content description data remains intact for the data that is included in the instant packet type. In this way network providers may build value into their respective network services.

Figure 2:
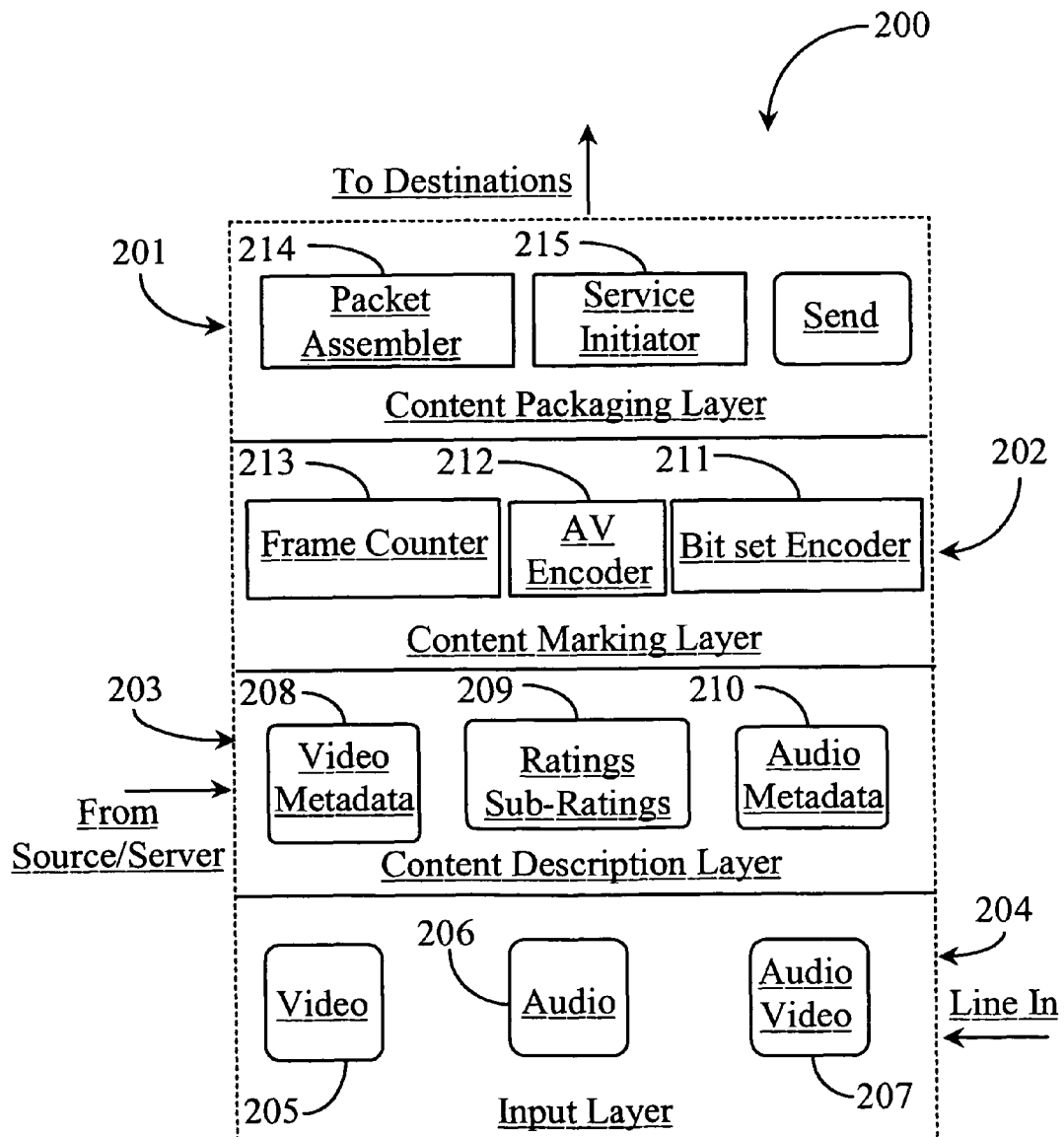
FIG. 2 is a block diagram illustrating content handling components for multimedia content rating and marking according to an embodiment of the present invention.

FIG. 2 is a block diagram illustrating content handling component layers for multimedia content rating and marking according to an embodiment of the present invention. Diagram 200 represents a logical view of a CM application that is analogous to CM 131a-d described with reference to FIG. 1 above and hereinafter referred to as CM 200. CM 200 may be a software application running on a hardware host system or a standalone hardware device running hardware or firmware without departing from the spirit and scope of the present invention. CM 200 has a logical or hardware data input layer 204 adapted to receive video content 205, audio content 206 and video/audio content 207. Input layer 204 may receive raw event data from a line in leading to an event source host node like a computer connected to a video camera for example. In one embodiment, raw data such as from a live event is input as data packets that are not marked for rating or for content.

However, metadata about a live event and content description may be passed along with the raw footage by the source or may arrive from a separate server associated with the source. CM 200 has a content description layer 203 provided thereto and adapted to receive video metadata 208 about video content, audio metadata 210 about audio content, and ratings/sub-ratings data 209. An event source host node may supply this data, or the data may be supplied by an intermediary provider node or even a third party service node set up between the event source host node and the CM node. At any event, to rate a program or presentation whether live or pre-recorded, the event may be manually reviewed in editing mode and an overall rating may be manually assigned. In the overall rating system, sub-rating categories and levels may be applied to certain portions of a program. For example, if a presentation is rated PG-13 overall, there may be some levels of violence, language, brief nudity, or the like in small portions of the program that may be additionally rated separately from the overall rating to provide more granularity.

Content description metadata may be metadata that describes small portions of a presentation that contain one or more video frames of nudity that might be considered "pushing the envelope" of an accepted PG-13 rating for example. If those particular frames are identified in the video stream then they may be tracked during packet assembly of the data and marked within the data packet payload they will be carried in. A unique aspect of the present invention is a capability of detecting that marked data and if sub-rating settings dictate, removing those data frames and replacing them with blank frames at the consumer during video display. In this way a consumer has more control than just accepting or rejecting an overall movie or video rating.

CM 200 has a content marking layer 202 provided therein and adapted to provide the packet information that will be used for each data packet in packet assembly of the presentation data. A frame counter 213 is provided and adapted to keep track of the video or audio frames of a presentation. An audio/video (AV) encoder 212 is provided and adapted to encode the presentation payload data for proper multimedia dissemination at the consumer's end, which may vary according to media application type and/or device type used to receive and display the presentation.

A bit-set encoder 211 is provided and adapted to encode the ratings data and content marker data as one or more bit-values that will occupy a content marking field of each data packet of the presentation assembled. The bit-values include at least the overall rating of the entire presentation and may also include any content marker information per each standard payload portion of a presentation according to the standard packet payload maximum allowed for each packet. In one particular embodiment, encoder 211 may apply more than one rating schema if the presentation will be viewed in more than one region or country. This may be accomplished by looking up the international ratings schemas from a table or getting them from IRD 106 described above with respect to FIG. 1.

CM 200 has a content packaging layer 201 provided thereto and adapted to package a presentation for delivery to consumers. Layer 201 has a packet assembler provided thereto and adapted to assemble the data packets for send using the information provided at the content marking layer 202. In a preferred embodiment, each data packet assembled has a content marker field inserted into the header portion of each packet. The field structure may be provided to support various rating systems similar to a union in C programming code. In this way an end delivery system may turn on the appropriate ratings schema for the country in which the programming is aired or viewed.

Within a content marker field, perhaps 8 bits could be reserved. A few bits could describe the overall rating of a presentation. One or more additional bits could describe sub-rating levels such as the level of violence, language, nudity, or the like of the entire presentation or of the data payload of the instant packet. In one embodiment, each packet of a presentation may be rated separately according to content found in the packet itself. For example, the beginning of a presentation may be rated Y-14 but some time in there is a scene that should really be rated MA (based on user opinion). One or more data packets carrying that scene could be rated TVMA instead of Y-14 thereby causing an end system rated for Y-14 or below to cut the TVMA scene (one or more packets) and replace it with blank screen frames.

In one embodiment of the present invention ratings sub-levels of violence, language, nudity, or the like are user-configurable and can be applied to an overall standard rating setting at a consumer station to further control content within the accepted rating. This feature is unique in that it allows a consumer to create his or her own personalized rating scheme based on the standard system. In this embodiment, metadata may be provided that describes the frame-by-frame levels related to sub-rating options that may exist throughout the presentation. In the case of a live event that will not be edited before broadcast, real time pattern recognition can be developed through empirical method and may be applied to describe content in real time as a data stream is input into layer 204 of CM 200. Such pattern recognition may be adapted to recognize patterns similar to patterns documented in graphics and audio snippets of a presentation.

CM 200 may be used in conjunction with studio editing to provide an accurate rating that is granular at least to the data packet level. CM 200 can be leveraged to provide rating data with little delay for live steaming video, audio, and audio/video presentations. In this regard, the process may be used for live interactive multimedia applications such as on-line video gaming, and other high-speed network interactive services. There are many possible applications.

One with skill in the art will recognize that CM 200 may be provided in separate parts or portions instead of as a single application without departing from the spirit and scope of the present invention. In one embodiment some of the function of CM 200 may be performed in a video/audio capture device or a host node connected to such as device. For example, a multimedia recording device like a video camera may be adapted to provide rich frame-by-frame content description using a metadata generation device, perhaps, extensible markup language (XML)-based metadata. In addition, the device may have access to the appropriate ratings system data via a table in memory or by data connection to an external data source such as IRD 106. In this embodiment all of the content description and rating data may be provided to an intermediate service provider in the form of metadata along with the captured video and audio data. The service provider responsible for rendering the stream to consumers could simply apply the ratings information per packet re-assembled for delivery.

It is noted herein that ratings data inserted as one or more bit values does not have to be performed for every single data packet of a presentation in order to practice the present invention. Less granular schemes may be applied such as header data being present in every 16$^{th}$ data packet, or in every 8$^{th}$ data packet. There are many flexible options.

Figure 3:
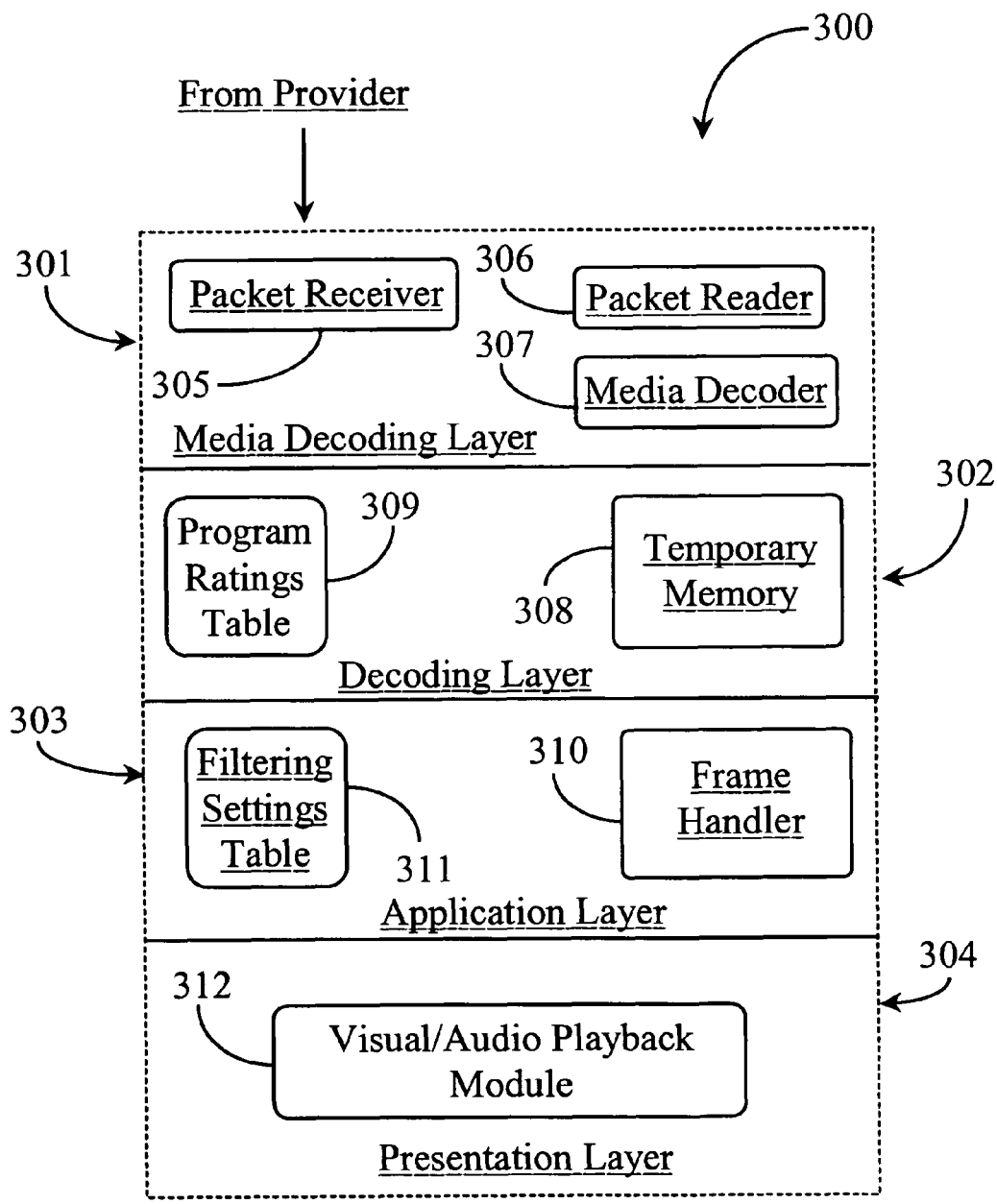
FIG. 3 is a block diagram illustrating decoding ware for parental content blocking and filtering according to an embodiment of the present invention.

FIG. 3 is a block diagram 300 illustrating decoding ware for parental content blocking and filtering according to an embodiment of the present invention. Diagram 300 illustrates a decoding application analogous to DC 129*a-d* described with reference to FIG. 1 and will hereinafter be refer to as DC 300. DC 300 may be a software plug in, a firmware, or a standalone application depending on host device configuration and function. For example, the form for a cellular telephone may differ from a form for a set-top box without departing from the spirit and scope of the present invention.

DC 300 has a packet-decoding layer 301 adapted to receive multimedia data packets from a network provider such as those providers described with reference to FIG. 1. Layer 301 has a data packet receiver 305 provided thereto and adapted to receive data packets of a presentation. Packet receiver 305 shall be assumed to contain all of the required components such as a queue buffer memory, input circuitry, and the like required to receive data packets from an external source. Many if not all of the components related to receiving data packets may be generic to the receiving device and not actually provided by the present invention.

Decoding layer 301 has a packet reader 306 provided thereto and adapted to read packets received. Packet reader 306 may be a reader generic to a receiving device and not provided by the present invention without departing from the spirit and scope of the present invention. Packet reader 306 disseminates the header information, performs checksum processing and the like. A unique rating decoder 307 is provided within layer 301 and adapted to read the ratings information in the content marker fields for each data packet received. Decoder 307 shall be assumed to be programmable and extensible to existing and new ratings schemas used.

DC 300 has a processing layer 302 provided thereto and adapted to process the information disseminated at the decoding layer. Processing layer 302 has a temporary memory utility 308, which may be partitioned for use from resident device memory. Memory 308 is used like a buffer to store payload data before processing. Layer 302 has a program ratings table 309 provided thereto and adapted to list the possible rating schemas and levels that the receiving device is programmed to work with. Table 309 may also contain the rating configuration settings programmed into the receiving device by an administrator or parent.

Within layer 302, the device attempts to match the relevant content marker information in each data packet with information contained in the ratings table and also keeps track of the payload portions stripped from each data packet. If the overall rating of a presentation (defined in the header of each data packet) exceeds the threshold set for that schema, then the payload of that data packet may be deleted from memory without further processing.

According to one embodiment, if the first of the received data packets has a rating (overall) defined in the content marker field that exceeds the acceptable rating (overall) set by the administrator (parent) for the presentation type, program media source, channel, or program then the device may not continue receiving presentation data and a message may be displayed to the viewer informing the viewer of the situation. This embodiment assumes that the overall rating designation is the same for each packet received.

If the data packets were rated separately using an overall schema, then some packets may not be acceptable and others may be acceptable when compared to the administrator's settings (table 309) for that presentation type, program media source, channel, or program. In this case, only the packets exceeding the ratings settings are dropped. Packets found to match or to be rated lower than the administrator's settings may be kept.

DC 300 has an application layer 303 provided thereto and adapted to apply sub-rating considerations such as levels of language, violence, nudity, and the like. In this layer, a filtering settings table is provided and adapted to contain any personal settings related to the existence of offensive language, sexual innuendos, levels of violence, suggestive dialogue, nudity, and so on that may be accepted under the overall rating but not accepted by the administrator. A configuration interface (not illustrated) may be provided as part of DC 300 for pre-setting levels of acceptable sub-rating categories of an overall rating level. For example, in an overall rating of PG-13 may allow some frontal nudity and a certain list of curse words. An administrator allowing the overall rating of PG-13 may further demand that there is no nudity and that only a level 1 list of swear or curse words is allowed.

The rating decoder may detect bit values set for sub-categories in each received data packet and those values may also identify certain "nude" frames of the presentation and certain audio frames containing "coarse language" relating to one or more of the list levels. That information is compared with the settings in table 311 to determine if the payload of a packet has any data that may exceed the administrator's ratings. A frame handler 310 is provided within layer 303 and is adapted to manage audio and video frames in the proper sequencing and certain offensive frames that have the objectionable data may be deleted from each packet payload. At an end host system there is no payload integrity issue that arises from dropping payload data. However, if the consuming device is connected to a LAN running a firewall, flow transport continuity issues may arise such as frame length, CRC checking, and so on. Deleted frames may be replaced with blank frames to keep the payload integrity in this case.

DC 304 has a presentation layer, which may be generic to the receiving device without modification by the present invention. Layer 304 has a video/audio playback module provided thereto and adapted to play the multimedia presentation on the display screen and over existing speakers of the receiving device using the appropriate media player or device. The playback module may receive the video/audio data from cache or buffer memory in the form having some original frames deleted and replaced with blank frames according to the application of the administrator's settings. The application of personalized sub-rating is optional and may not be activated by default. If no ratings settings are applied to a presentation type, media channel, media source, program, or program group then the uncut version of whatever is received will be displayed. Frame handler 310 has an extension (not physically illustrated) to playback module 304 as, in this embodiment, it is the frame handler that actually blocks content based on received information.

A parent or administrator may apply different ratings settings to apply to different screen names if that feature is available on a receiving device. Likewise, different rating settings may be applied to audio, and video of a same presentation. For example, the parent does not mind the offensive language in a R-rated presentation, but cannot accept visual sexual situations that are typically allowed under the R rating. A parent or administrator may also control sub-title display as part of the audio control since they are synchronized at the same time references.

The methods and system of the present invention is not limited to full length industry approved presentations. Any multimedia snippet, movie clip, audio clip, or the like may be rated and filtered or blocked at threw receiving device. If the receiving device does not detect any data in the content marker fields of received data packets of a presentation, or does not detect the presence of the marker field at all, then the content is not marked according to the methods and system of the present invention and may be rejected by default. However, in another embodiment if the un-marked presentation is conventionally rated the receiving device may default to a conventional ratings setting to determine if the content will be allowed or not.

One with skill in the art will recognize that some of the components described in this embodiment may be generic to a receiving device and not necessarily provided by the present invention. Minimally, only decoder 307, and tables 309 and 311 need be provided as an extension to an in place receiver system component that would normally receive and decode digital data for playback. A small processing application may be provided to manage settings and ratings table lookup and to make a determination based on content marker data detected of what packet payload data of a presentation will eventually be displayed if any.

Figure 4:
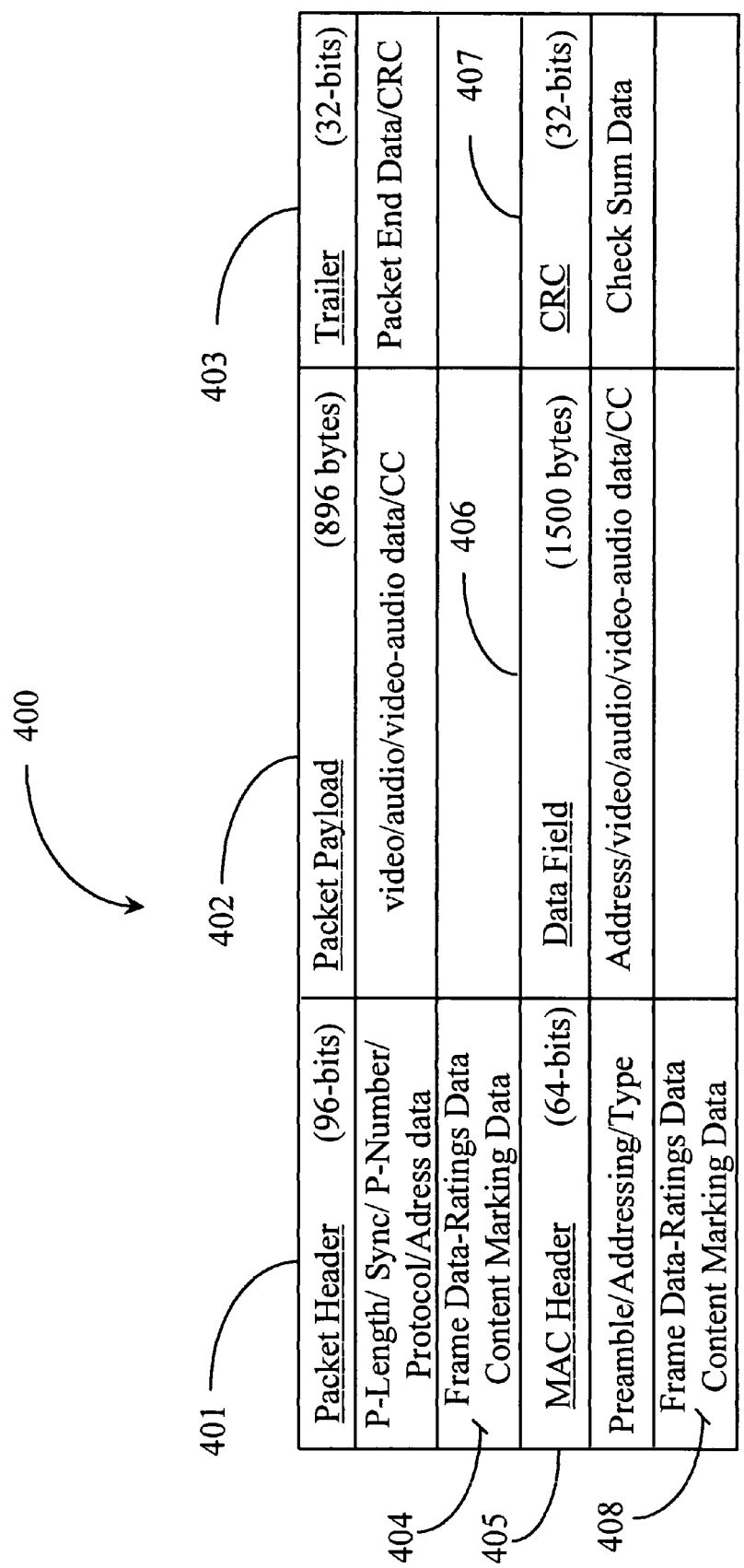
FIG. 4 is an exemplary data packet structure enhanced with ratings information according to an embodiment of the present invention.

FIG. 4 is a block diagram of exemplary data packet structure (table 400) enhanced with ratings information according to an embodiment of the present invention. Table 400 logically represents the basic structure of two different data packet types. Table 400 is divided into 3 separate columns that are basic and typical of the three basic portions of a data packet. A first portion or table column represents a data packet header 401 of a typical TCP/IP data packet. Reading from the top of header 401, a packet header of a TCP/IP data packet contains typically 96-bits of data. The data includes the length of the data packet (P-Length), synchronization data (Sync), the packet number (P-Number), the packet protocol, and the addressing data identifying the sender and receiver of the packet.

A packet payload 402, reading from the top, identifies a packet payload typically containing 896 bytes of data. A multimedia data packet may be much longer in most cases. The packet payload for a multimedia packet contains the actual video/audio/video-audio, and any text data. A packet trailer 403 represents the trailer portion or footer portion of a data packet. For a TCP/IP packet, the trailer contains data signifying the end of the packet and cyclic redundancy check (CRC) data validating the integrity of the data packet. One with skill in the art will understand that there are a variety of layer two protocols for transporting data that may be used without departing from the spirit and scope of the present invention.

A content marker field 404 is provided within the packet header 401 and according to a preferred embodiment and contains at least ratings data, which may be overall rating information for an entire presentation or for just that data packet in some cases. Content marking data is provided to identify any included information pertaining to levels of violence, language, nudity, sexual situations, or other sub-rating categories which may be contained somewhere in the payload portion of that data packet. In one embodiment, frame data may be provided as a marker indication which "movie" frame or "audio" (once displayed) may contain marked content.

A packet payload may be of a fixed size from packet to packet of a same stream, or packet payloads may vary from packet to packet without deterring from the accuracy of content marking. Likewise, the actual frame size of a video or audio presentation displayed for viewing may vary from frame to frame. Any marked content may be detected during reading of packets and then eliminated during construction of the data in the movie format for display and replaced by a blank frame.

Table 400 also illustrates an example of a basic Ethernet packet construction. A MAC header portion 405 is illustrated and contains typically 64 bits of data. This is followed by a "data field" 406 analogous to TCP/IP payload 402 and typically contains 1500 bytes of data or up to 9 kilobytes if enabled for "jumbo frames". A CRC portion of typically 32 bits follows this portion. The CRC portion contains check sum data to validate the data packet integrity.

A content marker field 408 is provided in a preferred embodiment within the MAC header portion 405 and like field 404 may contain frame data, ratings data, and content marking data. Ratings data may describe the overall rating for a presentation, in which case the same data would be in each packet content marker field. In another embodiment each packet may be separately rated. Content marking data may include indication of the existence of any content in the packet payload data falling under any sub-rating categories and the level or ranking information of that content. For example, if a user has set the level of violence accepted within an overall rating at a level 2 and the content marking information indicates violence at a level 3 in the payload data then. The frame data would indicate which movie or audio frame or frames will contain the data. Those frames may be deleted when the movie data or audio feed is constructed for display using a media player. The offending frame or frames may be replaced with padded or blank frames to keep the original data size of the presentation.

It is noted herein that the content marker field may only contain overall ratings information. In one embodiment, a consumer may configure sub-rating category levels that are acceptable for any overall rating category. One with skill in the art will recognize that any audio clip or video may be reviewed in a studio setting and frame-by-frame analysis for ratings data can be performed. In one embodiment, such analysis may include generation of metadata that may describe rated content within the presentation like a series of frames depicting a violent act. In this embodiment, it is possible that the metadata describing the sub-category, level of the sub-category, and the "frame" location with respect to the eventual presentation may be embedded within the data payload portion of a data packet at the beginning instead of providing the information as content marking data and frame data in the content marker field. In this case the content marker field would still contain the overall rating indication according to one or more schemas.

The latter embodiment described above may rely on the media player device or application to use the metadata information in its instruction set for playing the media and would block certain frames which exceed a consumer's settings regarding the sub-category. The media player would need to be adapted for assembling blank frames and replacing marked frames with them in real time as the presentation is displayed.

Figure 5:
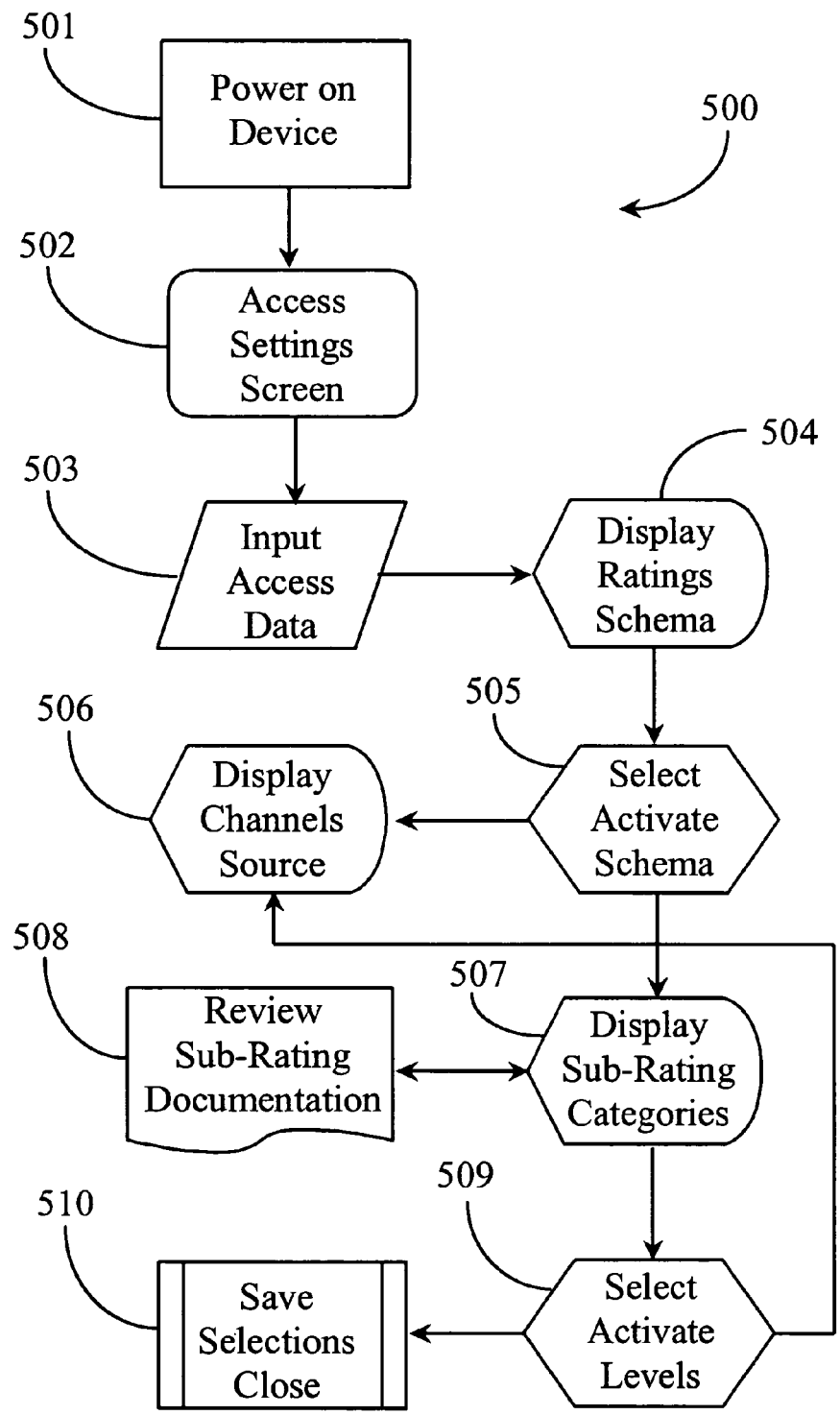
FIG. 5 is a process flow diagram for configuring a media presentation device for content filtering according to an embodiment of the present invention.

FIG. 5 is a process flow diagram 500 for configuring a media presentation device or software for content filtering according to an embodiment of the present invention. At step 501 a consumer powers on a host station used to receive and play multimedia according to an embodiment of the present invention. At step 502, the consumer may access a settings configuration screen adapted to accept settings input from the consumer.

At step 503, a consumer may be required to input some authorization data like a pass code or password in order to gain access to the configuration screen. At step 504, one or more overall ratings schemas, preferably standardized schemas, are displayed. This screen displays the entire collection of overall ratings levels for each schema; for example, Y, Y7, G, PG, TV14, and MA comprise a standard US rating system. A schema having these ratings may also include sub-ratings like V, S, L, and D. Foreign ratings systems may also be available and displayable on the ratings screen of step 504.

At step 505, a consumer may select a rating and activate it to one or more channels, programs, media types, or known media sources for application. A consumer may select Y7, for example, from the offered levels of a rating system. At step 506, the consumer may display target channels, programs, media types, or known media sources known to the system. In this step, the consumer may select those items automatically applying the rating level to each selected item. Perhaps, the system can receive music downloads from a known Internet-based, interactive music channel as well as from regular satellite channel programming. The consumer may select the music channel as a whole and automatically apply a Y7 rating or equivalent for receipt of all music received over the music service. In a situation of filtering music, a different ratings schema more applicable to music may be developed and standardized. In this case, no music can be accessed over that channel unless it is music appropriate to children about 7.

In one embodiment ratings for music may also include sub-rating categories related to the type of lyrics in a song like sexual lyrics, violent lyrics, racist lyrics, or lyrics that may be considered degrading to women, police officers, or other groups. Each of these categories may be configurable according to some level within an overall rating. A Y7 rating for music, implying that no music not appropriate for a 7 year old will be played my not contain any levels of the sub-categories mentioned above by virtue of its overall rating. However, some subtler sub-categories may be developed like, for example religious sub-categories for music listened to by children. One parent may not like any religious implications while another may prefer all music have religious overtones. There are many possibilities.

After configuring overall ratings, the system now can block those channels, programs, media sources, or presentations that exceed the set rating for that item. At step 507, the consumer may call up a screen displaying the sub-rating categories for any overall rating. If desired, the consumer may access and review documentation explaining rating categories and sub-categories at step 508. Such documentation may explain exactly what levels sub-categories like violence, language, etc. are allowed under an overall rating.

At step 507 a consumer may customize the sub-rating levels for each activated overall rating. For example, if a general overall rating of R allows moderate violence, the consumer may apply a customized lower level of violence allowed such as for example minimum violence. When set, a presentation will be accepted that is generally rated R but each data packet of the presentation that contains violence that exceeds the custom minimum level will be filtered to remove the scenes depicting moderate violence. It is assumed in this example of customizable sub-rating levels that the presentation is rated according to those possible sub-rating category levels frame-by-frame in the studio editing process before it is assembled as data packets for delivery to the consumer and that the existence of those levels that may exceed the consumer setting for those sub-rating categories is detectable either in each content marker field of each data packet, or in metadata embedded in the payload of each data packet.

At step 509, the consumer activates all of the sub-rating categories selected for each general overall rating applied. It is noted herein that a consumer may select sub-rating category levels that apply to each overall rating category of a rating system without targeting any program, channel, media source, or program group. If this is the case then after the overall ratings have their respective sub-rating category levels set, they may be applied simply as a rating parameter to any channel, media type, media source, and so on. So in a broad sense, a consumer may first set levels for L, V, S, and D applying to the rating R and then may apply the rating R to "any media from the Internet" for example. If a rated presentation were then downloaded from the Internet for display; it would be shown if rated less than "R", for example, PG-13; it would be shown if rated "R" and the sub-category levels are within the consumer's preset levels for those categories; it would be blocked if rated beyond "R", for example, "MA"; and it would be blocked if rated "R" and sub-category levels exceed the consumer's preset levels for those categories.

Content filtering would occur according to the consumer's settings of the sub-rating category levels selected as the stream is downloaded to the consumer device. If there are no content markers found in the first few data packets to indicate that the presentation is marked for existence and level of the rating sub-categories of the overall rating R then by default the R rated presentation may still be rejected out of hand. In one embodiment, a pattern recognition scheme may be developed for audio and video scene content that may allow some content filtering based on typical sound and video signature or pattern equating to violence, nudity, harsh language, and so on. In this case, the media player may recognize some objectionable content as the presentation is assembled for display and may block the content replacing it with blank display. In one embodiment, a pattern recognition scheme may be used to mark content in real time for live feeds that are not particularly edited before rebroadcast.

In one embodiment, the consumer may activate sub-rating category levels according to media channel and source that may be generally rated, in which case the process may resolve back to step 506 for display and selection of those source targets. This may be a repetitive process to the extent any consumer/administrator desires to apply ratings and sub-rating thresholds to filter media from any available source.

Figure 6:
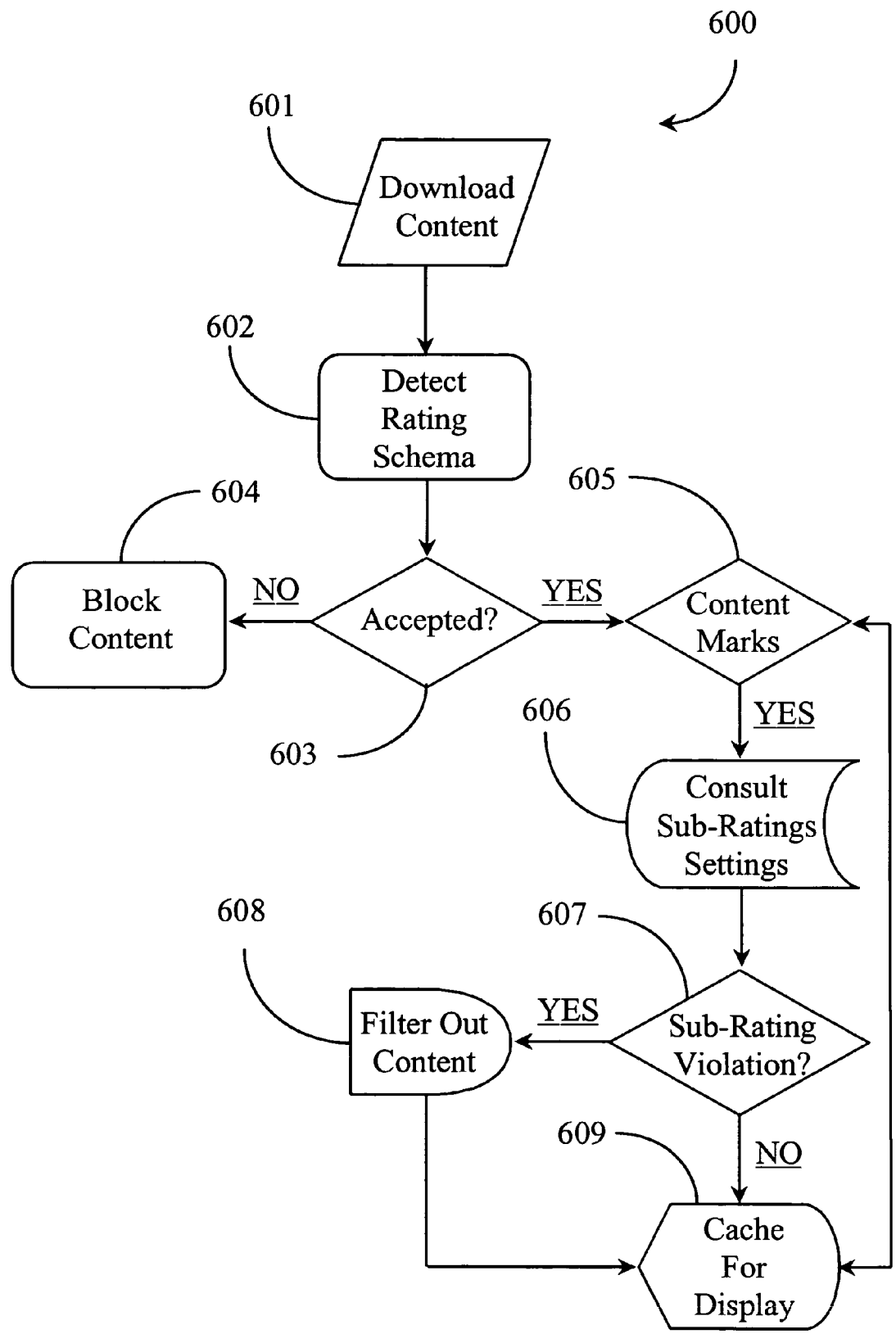
FIG. 6 is a process flow diagram illustrating an automated procedure for filtering content of an accepted program according to an embodiment of the present invention.

FIG. 6 is a process flow diagram 600 illustrating an automated procedure for filtering content of an accepted program according to an embodiment of the present invention. At step 601, the consumer device begins receiving or downloading the content. At step 602, the consumer device detects the rating schema at the packet level as soon as the first few packets are received. At step 603 a determination is made whether the overall ratings setting on the device set by the consumer enables acceptance of the presentation as a whole.

At step 603 if the rating of the presentation exceeds the rating set by the consumer then at step 604, the content may be blocked and no further download activity ensues. At step 603 if the presentation rating detected is accepted then the device checks to see if there is any marked content according to sub-rating information. This process is performed for each data packet received. It is noted that the first several data packets received mark the beginning of a presentation and therefore may not contain any real content other than the prelude music and graphics found in the beginning of many presentations. However, one or more bits set in the first few data packets may reveal if there is any marked content or embedded metadata in latter data packet payloads of the presentation.

If at step 605, there is no indication in the first few data packets that there is content marking in the presentation, then the process may resolve back to step 604 and the presentation may be blocked. However, if there is indication in the first few data packets that the content of the presentation is rated according to sub-categories of the overall rating then the device continues to receive and check every data packet for content marking information. When it finds a first packet containing marked and rated content then at step 606 the device consults the sub-ratings settings for the content indicated. For example, of 4 sub-ratings V, L, S, and D used as an example, a packet may indicate that there is V contained in the payload of that packet at a maximum level for the R rating. The sub-category V may be allowed a minimum, a moderate, and a maximum level or 3 levels. At step 607 the device determines if there are any violations. For example, if the device finds that the user setting is minimum for V, then that data from the packet may be tagged for removal and replacement with blank data. If the user has the maximum level set then the packet remains unedited. Therefore at step 607 if the device finds that there is a violation then at step 608 the offensive content is filtered out. If there is no violation at step 607, then at step 609 the payload data is cached unedited for display.

Step 607 may occur for each sub-rating category included in the scheme. However for any single packet payload, it may be that there are none, one, two, or all of the categories occurring in the payload data. Likewise, one category V might be acceptable whereas L may exceed the threshold causing only the L in the payload to be edited out. The process is performed for each data packet received that is identified as a sequential part of the presentation.

Using the sub-ratings configuration technique, a consumer may have more control over a general rating system as it applies to rated programs than is otherwise available in current art. For example, if a presentation is considered good viewing except for a few highly objectionable scenes, then the presentation may be enjoyed without worrying that those scenes will appear. However, if a consumer accepts an R rated program, but insists on minimum levels of V, L, S, and D, significant portions of the presentation may be blanked out in some cases making the presentation less understandable to the viewer. However, it is known in the art that many current ratings such as MA or R assigned to programs are the result of only a few objectionable or controversial scenes contained in the movie, for example rape scenes. Therefore, setting a minimum or a zero setting for rape scenes would result in the virtual cutting of all of the rape scenes in the presentation.

One with skill in the art of rating systems will recognize that the method and system of the present invention may be applied to current ratings systems used now without departing from the spirit and scope of the present invention. The current ratings system used defines sub-category levels accepted for each rating except for the lowest ratings such as G or Y. For example, a PG-13 may allow "mild profanity" whereas an R rating might allow "moderate profanity". This information can generally be viewed on screen before a movie is selected and viewed. The sub-rating configuration and content marking technique enables a consumer to enjoy the R rated presentation with the level of profanity constrained to "mild" for example.

There are many possible embodiments that might be created using existing and new ratings systems. Vendors may create new sub-ratings configuration options applicable to new rating types. For example, a G-rated movie for children may include sub-ratings for controlling the level of religious references in a movie. General ratings systems may be devised for audio presentations like music clips wherein the sub-rating categories may be controlled to an extent by filtering out degrading lyrics and the like.

If rating settings are applied to a media source, the source may be defined broadly, such as all media downloaded or streamed from the Internet, or more narrowly such as all video downloaded or streamed in from a particular named Web-service. Ratings settings may also be configured per user such that any user must login to view programming wherein the login identification and confirmation determines the ratings settings that apply.

The methods and system of the present invention may be practiced over any network carrying data packets or data frames that has access to network layer transport protocols. In light of the various embodiments many of which have been described, the spirit and scope of the present invention should be afforded the broadest interpretation under examination. The spirit and scope of the present invention is limited only by the claims, which follow.

What is claimed is:

1. A system rating multimedia content streamed over a data network as a series of data segments, and administering display of the content, the system comprising:
    at least one content source device creating raw multimedia content as data packets having fields in a packet header;
    an intermediate content marking and delivery agent inserting rating information in the content by marking one of the fields in the packet header of the data packets carrying data payload for the data segments in the content and delivering the segments; and
    a content receiving device processing the information in the marked field of the packet header of the data packets and displaying or rejecting the delivered content according to detection of and comparison of the information in the marked field of the packet header of the data packets.

2. The system of claim 1, wherein the network is one or a combination of an Internet protocol network, a satellite television network, a cable television network, and a cellular telephony network.

3. The system of claim 1, wherein the content source device is one of a video camera, a video telephone, a Web camera, or a microphone.

4. The system of claim 1, wherein the content receiving device is one of a television, a set-top box with a connected video display unit, a computer with a video display screen, or a cellular telephone.

5. The system of claim 1, wherein the content marking and delivery agent is one of an Internet service provider, a satellite programming provider, a cable programming provider, or a cellular telephone service provider.

6. The system of claim 1, wherein the multimedia content includes one or a combination of video and audio and text subtitle.

7. The system of claim 1, wherein the content markings include one or a combination of an overall rating and at least one sub-rating category level.

8. The system of claim 7, wherein the sub-rating category levels are configurable.

9. A utility applying rating information related to multimedia content to data segments adapted to carry the content over a data network comprising:
    an input port receiving the multimedia content as data packets having fields in a packet header;
    a segment builder creating data segments of the content;
    a data bit handler within the segment builder rating the data segments by inserting, removing, or otherwise manipulating existing bit values of rating information contained in one of the fields of the packet header of each data packet carrying data payload for the content of the data segments; and
    an output port outputting the created data segments for network delivery.

10. The utility of claim 9, wherein the utility is software application running on a host multimedia processing terminal and the input and output ports are virtual ports.

11. The utility of claim 9, wherein the utility is a hardware device running software and the input and output ports are hardware port structures.

12. The utility of claim 9, wherein the data network is one or a combination of an Internet network, a satellite television network, a cable television network, and a cellular telephony network.

13. The utility of claim 9, wherein the multimedia content includes one or a combination of video and audio and text subtitle.

14. The utility of claim 9, wherein the bit values define one or a combination of an overall rating and at least one sub-rating category level.

15. The utility of claim 9 further comprising: metadata associated with the multimedia content received, the metadata describing at least existence of, categorization of and level of the categorized content according to a ratings system.

16. The utility of claim 15, wherein the metadata is extensible markup language received with the multimedia content.

17. The utility of claim 9, wherein the field carrying the rating information is a field added to the header portion of each data packet.

18. The utility of claim 9, wherein the field carrying the rating information and bit values are provided by a network layer transport protocol.

19. The utility of claim 18, wherein the protocol is an extension of the real-time transport protocol.

20. In cooperation with a utility for applying rating information related to multimedia content to data segments adapted to carry the content over a data network, a method for administering display of the rated multimedia content comprising steps of:
    (a) creating multimedia content as data packets having fields in a packet header;
    (b) applying rating information to the individual data packets carrying data payload of the multimedia content by inserting rating information in one of the fields of the packet header of the data packets of the content;
    (c) beginning download of the content to a content player;
    (d) determining rating of the content by processing the rating information in the field of the packet header of the data packets into which the rating information is inserted;
    (e) comparing the determined rating of the content to one or more preset values applying to the content; and
    (f) determining whether to display the content based on the comparison results.

21. The method of claim 20 wherein in step (c), the content player is one of a television set, a set-top box having a video display unit, a software media player, or an audio playback device.

22. The method of claim 20 wherein in step (d), the rating represents a rating level associated with a rating system of more than one rating level.

23. The method of claim 22 wherein in step (d), the rating further defines at least one sub-rating category and the level of existence of the at least one category in the data packet, data frame, or data segment.

24. The method of claim 20 wherein in step (e), the comparison is made by consulting a ratings settings table.

25. The method of claim 20 wherein in step (e), the one or more preset values define an acceptable rating and one or more acceptable levels of any sub-rating categories associated with the determined rating.

26. The method of claim 23 wherein in step (d), the sub-rating category levels may be adjustably set according to a provided increment of adjustment, the one or more preset values then defining an acceptable overall rating and any levels of associated sub-rating categories associated with the overall rating.

27. The method of claim 23 wherein in step (d), the sub-rating categories define content not categorized by violence, nudity, coarse language, or suggestive dialogue.

28. The method of claim 20 wherein in step (f), the resulting determination is one of blocking the content in its entirety from display.

29. The method of claim 20 wherein in step (f), the resulting determination is one of displaying the content in its entirety.

30. The method of claim 20 wherein in step (f), the resulting determination is one of displaying some of the content and blocking some of the content replacing the blocked content with blank display.

31. The method of claim 30 wherein in step (f), the resulting determination is one of displaying video while blocking audio.

32. The method of claim 30 wherein in step (f), the resulting determination is one of blocking video while displaying audio.

33. The method of claim 30 wherein in step (f), the resulting determination is one of displaying and blocking some video and some audio.

34. The method of claim 30 wherein in step (f), the content includes subtitling.

* * * * *